(12) United States Patent
Rusta-Sellehy et al.

(10) Patent No.: US 7,045,230 B2
(45) Date of Patent: May 16, 2006

(54) CHEMICAL HYDRIDE HYDROGEN GENERATION SYSTEM AND FUEL CELL STACK INCORPORATING A COMMON HEAT TRANSFER CIRCUIT

(75) Inventors: Ali Rusta-Sellehy, Richmond Hill (CA); David Frank, Scarborough (CA)

(73) Assignee: Hydrogenics Corporation, Mississauga (CA)

(*) Notice: Subject to any disclaimer, the term of this patent is extended or adjusted under 35 U.S.C. 154(b) by 776 days.

(21) Appl. No.: 09/986,636

(22) Filed: Nov. 9, 2001

(65) Prior Publication Data

US 2003/0091876 A1 May 15, 2003

(51) Int. Cl.
*H01M 8/04* (2006.01)
*H01M 8/06* (2006.01)

(52) U.S. Cl. .............................. 429/17; 429/20; 429/24; 429/25; 429/26

(58) Field of Classification Search ................ 429/17, 429/19, 20, 22, 23, 24, 25, 26
See application file for complete search history.

(56) References Cited

U.S. PATENT DOCUMENTS

| 3,459,510 | A | | 8/1969 | Litz et al. |
| 5,200,278 | A | * | 4/1993 | Watkins et al. ............... 429/24 |
| 5,202,195 | A | * | 4/1993 | Stedman et al. .............. 429/17 |

(Continued)

FOREIGN PATENT DOCUMENTS

| EP | 1170249 A1 | 1/2002 |
| JP | 2002154803 | 5/2002 |
| WO | WO/0151410 | 7/2001 |
| WO | WO 02/066369 | 8/2002 |

OTHER PUBLICATIONS

Wu, "Hydrogen Storage via Sodium Borohydride", presentation at GCEP–Stanford University (Apr. 2003).*
Amendola, S.C., et al., "A safe, portable, hydrogen gas generator using squeous borhydride solution and Ru catalyst", International Journal of Hydrogen Energy, 25 (2000), pp. 969–975, Elsevier Science Ltd., GB.
Amendola, S.C., et al., "An Ultrasafe Hydrogen Generator: Aqueous, Alkaline Borohydride Solutions and Ru Catalyst", Preprints of Symposium–American Chemical Society, Division of Fuel Chemistry, American Chemical Society, vol. 44, No. 4, 1999, pp. 854–868.
Seifritz, W., "Letter to the Editor", International Journal of Hydrogen Energy, vol. 26, No. 4, Apr. 2001, p. 403, Elsevier Science Publishers B.V., Barking, GB.
Aiello, R., et al., "Production of Hydrogen Gas from Novel Chemical Hydrides", International Journal of Hydrogen Energy, vol. 23, No. 12, pp. 1103–1108, 1988, Elsevier Science Ltd., GB.

*Primary Examiner*—Stephen J. Kalafut
(74) *Attorney, Agent, or Firm*—Bereskin & Parr

(57) ABSTRACT

A chemical hydride hydrogen generation system and an energy system incorporating the same are provided. The hydrogen generation system has: a storage means for storing a chemical hydride solution; a reactor containing a catalyst; and a pump for supplying the chemical hydride solution from the storage means to the reactor so that the chemical hydride solution reacts to generate hydrogen in the presence of the catalyst. The hydrogen is supplied to a fuel cell stack. Additionally, a heat transfer circuit is provided including a heat transfer fluid that is circulated through the cooling channels of the fuel cell stack to effect heating thereof on startup, and cooling once the operating temperature is reached.

23 Claims, 8 Drawing Sheets

U.S. PATENT DOCUMENTS

| | | |
|---|---|---|
| 5,372,617 A | 12/1994 | Kerrebrock et al. |
| 5,804,329 A | 9/1998 | Amendola |
| 6,143,359 A | 11/2000 | Rendina |
| 6,195,999 B1 | 3/2001 | Arnold et al. |
| 6,228,338 B1 | 5/2001 | Petrie et al. |
| 6,316,133 B1 * | 11/2001 | Bossel .................... 429/17 |
| 6,592,741 B1 * | 7/2003 | Nakanishi et al. ........ 429/17 X |
| 2001/0038821 A1 | 11/2001 | Petrie et al. |
| 2002/0025462 A1 | 2/2002 | Nakanishi et al. |
| 2002/0182459 A1 | 12/2002 | Hockaday et al. |
| 2003/0014917 A1 | 1/2003 | Rusta-Sallehy et al. |
| 2003/0091877 A1 | 5/2003 | Chen et al. |

* cited by examiner

CHEMICAL HYDRIDE HYDROGEN GENERATION SYSTEM AND FUEL CELL STACK INCORPORATING A COMMON HEAT TRANSFER CIRCUIT

FIELD OF INVENTION

This invention relates to a hydrogen generation system and more particularly relates to a chemical hydride hydrogen generation system in combination with a fuel cell stack.

BACKGROUND TECHNOLOGY

Hydrogen has been recognized as an environmentally friendly clean fuel of the future since it has various applications in power generation systems. For example, hydrogen can be used as a fuel for fuel cells, especially proton exchange membrane fuel cells, which use hydrogen and air to produce electricity, generating only water as a by-product. Fuel cells are being developed to replace traditional electricity generators because they produce clean, environmentally friendly energy. However, these fuel cells require external supply and storage devices for hydrogen. Extensive efforts have been made to develop a safe and efficient way to store hydrogen, especially in mobile applications. Conventional hydrogen storage technologies include liquid hydrogen, compressed gas cylinders, dehydrogenation of compounds, chemical adsorption into metal alloys and chemical storage as hydrides. However, each of these systems is either hazardous or bulky.

Another method of storing hydrogen has been proposed recently. This method uses a classical chemical hydride, such as $NaBH_4$, as a hydrogen storage medium. The principle of this method is the reaction of the chemical hydride with water in the presence of a catalyst to generate hydrogen, as shown in the equation below:

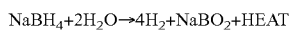

$$NaBH_4 + 2H_2O \rightarrow 4H_2 + NaBO_2 + HEAT$$

The borohydride, $NaBH_4$, acts as both the hydrogen carrier and the storage medium. Ruthenium, Cobalt, Platinum or alloys thereof can be used as a catalyst in this reaction. It is to be noted that this reaction occurs without a catalyst in an acidic environment and only slightly under alkali conditions. This means the chemical hydride solution can be stored and has a shelf life under alkali conditions. This reaction is efficient on a weight basis since half of the hydrogen produced comes from $NaBH_4$ and the other half comes from $H_2O$. Borohydride is a relatively cheap material, usually used in wastewater processing, pharmaceutical synthesis, etc. Borohydride is also easier and safer to handle and transport than highly pressurized hydrogen or cryogenic hydrogen. As a result, there are some advantages to use borohydride as a method of storing hydrogen as a fuel for fuel cells.

There are several known examples of hydrogen generation systems that utilize chemical hydrides. One type of hydrogen generation system comprises a closed vessel for containing chemical hydride and a mechanical stirring mechanism disposed within the vessel for stirring the chemical hydride within the vessel. Water is injected into the vessel to react with chemical hydride and generated hydrogen is removed from the vessel through an outlet. The stirring mechanism means is used to ensure sufficient contact between the hydride and water while preventing the clumping of the hydride. Since the hydride is in solid phase in this system, the stirring mechanism is indispensable. However, in such systems the stirring mechanism consumes energy, increases the overall system weight and reduces system efficiency. Further, the noise generated in the stirring operation is undesirable. In addition, the reaction rate is low, making the fuel unresponsive, useless or very hard to control. The system also tends to be large and cumbersome.

Another type of hydrogen generation system employs a chemical hydride solution. In this system an aqueous chemical hydride solution is introduced to a catalyst bed to generate hydrogen. However, there are a number of problems associated with this liquid phased system. First, the by-product borate, in the above equation, $NaBO_2$ is less soluble then the reactant borohydride, namely $NaBH_4$. Specifically, $NaBO_2$ is only approximately 20% soluble. This means that in order to generate hydrogen in a liquid phased system, and thereby reduce the problems associated with the aforementioned solid phased systems, the concentration of borohydride in the solution can only be about 20% which is much lower than borohydride's solubility in water. Therefore the achievable hydrogen density of the system is considerably limited.

A further deficiency of the aforementioned examples is that neither system is capable of responding in real time to the fuel (hydrogen) needs of the fuel cell. This ability is referred to as load following ability.

SUMMARY OF THE INVENTION

In order to overcome the aforementioned deficiencies associated with the prior art, one aspect of the present invention provides a method of operating a fuel cell stack and chemical hydride hydrogen generation system with a catalyst including a reactor for generating hydrogen for the fuel cell stack and controlling the temperature of the fuel cell stack and the chemical hydride generation system, the method comprising the steps of:

1) supplying a chemical hydride solution to the reactor, and permitting the catalyst to catalyze reaction of the chemical hydride solution to generate hydrogen;
2) supplying the hydrogen to the fuel cell stack and supplying an oxidant to the fuel cell stack, for generation of electricity;
3) circulating a heat transfer fluid through the fuel cell stack and the chemical hydride generation system, to effectively transfer heat therebetween.

On initial start up, step (3) of the method can include permitting heat generated in the reactor to heat up the heat transfer fluid, passing the heated fluid through the fuel cell stack to promote heating of the fuel cell stack while permitting heat generated in the fuel cell stack to heat up the fluid, and circulating the fluid back to the reactor, thereby bringing the fuel cell stack and the reactor to respective optimum operating temperatures.

Another aspect of the present invention provides an energy system which comprising:

a fuel cell stack for generating electricity from hydrogen and an oxidant to form water;

a chemical hydride hydrogen generation system, comprising:

a storage means for storing a chemical hydride solution comprising a solution of a chemical hydride solute in a solvent;

a reactor containing a catalyst, for catalyzing reaction of the chemical hydride to generate hydrogen;

a first pump means connected between the storage means and the reactor in a first circuit, for circulating the chemical hydride solution through the storage means and the reactor, so that the chemical hydride reacts to generate hydrogen in the presence of the catalyst;

a first connection between the chemical hydride generation system and the fuel cell stack for supplying hydrogen to the fuel cell stack; and a heat transfer circuit including second connections between the chemical hydride generation system and the fuel cell stack, for circulation of a heat transfer fluid through the fuel cell stack to effect heat transfer between the fuel cell stack and the chemical hydride solution.

The chemical hydride solution can be a borohydride hydride water solution. The solute of the solution can be in the form of $MB_xH_y$, in which M is a metal. Specifically, the solute can be $NaBH_4$, $LiBH_4$, $KBH_4$, $RbH_4$. Alternatively, the solute can be $NH_3BH_3$. Preferably, the chemical hydride solution is a water solution in which the solute is $NaBH_4$ and less than 5% $LiBH_4$. Preferably, to ensure the system works properly under low temperature, the chemical hydride solution further includes a freezing point depressing agent. The freezing point depressing agent is preferably glycerol and concentration of glycerol is no higher than 5%. More preferably, the concentration of glycerol is 1%. The solution preferably further includes alkaline additives. More preferably, the alkaline additive is selected from LiOH, KOH, and NaOH. More preferably, the alkaline additive is 0.1% NaOH.

More preferably, the system further includes a flow control means that operatively stops the first pump means when the hydrogen pressure in the reactor reaches a first value and activates the first pump means when the hydrogen pressure in the reactor reaches a second value lower than the first value. More preferably, the system further includes a heat exchanging means for the reactor that selectively removes heat from the reactor during normal operation and heats up the reactor when the system works under low temperature.

Preferably, the means for supplying hydrogen generated in the reactor to the fuel cell further includes a filtering means between the reactor and the fuel cell for purifying the hydrogen generated in the reactor before the hydrogen is supplied to the fuel cell stack.

In order to provide the energy system with load following capability, the system further includes a second control means that operatively stops the first pump means when the hydrogen pressure in the reactor reaches a first value and activates the first pump means when the hydrogen pressure in the reactor reaches a second value lower than the first value.

In order to ensure that the energy system works properly under low temperature, the system further includes a heat exchanging means for the reactor that selectively removes heat from the reactor during normal operation and heats up the reactor when the system works under low temperature.

The fuel cell stack can be a fixed cell stack including coolant ducts for the coolant. Additionally, the fuel cell stack could comprise just a single fuel cell or could include a plurality of stacked fuel cells.

The chemical hydride hydrogen generation system according to the present invention provides a safe, clean, efficient and reliable hydrogen generation system and an energy system in which the hydrogen generation system and the fuel cell system operate synergistically. The hydrogen generation system is safe in that low pressure hydrogen is generated and used in the fuel cell instead of highly pressurized hydrogen. The system is also environmentally safe in that the reaction products are harmless detergent base chemicals. When novel borohydride solution is used, the system can operate at as low as −22° C. temperature. The pressure control means employed in the system enables the system to follow the load of fuel cell stack as well as meet peak performance requirements. By capturing and recycling the water in the fuel cell exhaust and introducing it into the hydride solution, the system of the present invention further enhances the energy density. Experiments show that the chemical hydride hydrogen generation system according to the present invention has achieved energy densities of 1.2 KWh/L and 0.8 KWh/kg, which is comparable, if not advantageous to fuel cell systems currently available. Hydrogen recycled through a filtration system could also allow for higher system efficiency as well as an increased chemical hydride energy density. The circulation of a heat transfer fluid between the fuel cell and the chemical hydrogen generation system provides the advantage of mutually warming up the chemical hydride reactor and the fuel cell stack, thereby shortening the time needed for the system to achieve optimum operation condition, and further improving the system efficiency.

BRIEF DESCRIPTION OF DRAWINGS

For a better understanding of the present invention, and to show more clearly how it may be carried into effect, reference will now be made to the accompanying drawings, which show, by way of example, preferred embodiments of the present invention, and in which.

DETAILED DESCRIPTION OF PREFERRED EMBODIMENTS

The features and advantage of the present invention will become more apparent in the light of the following detailed description of preferred embodiments thereof.

Figure 1:
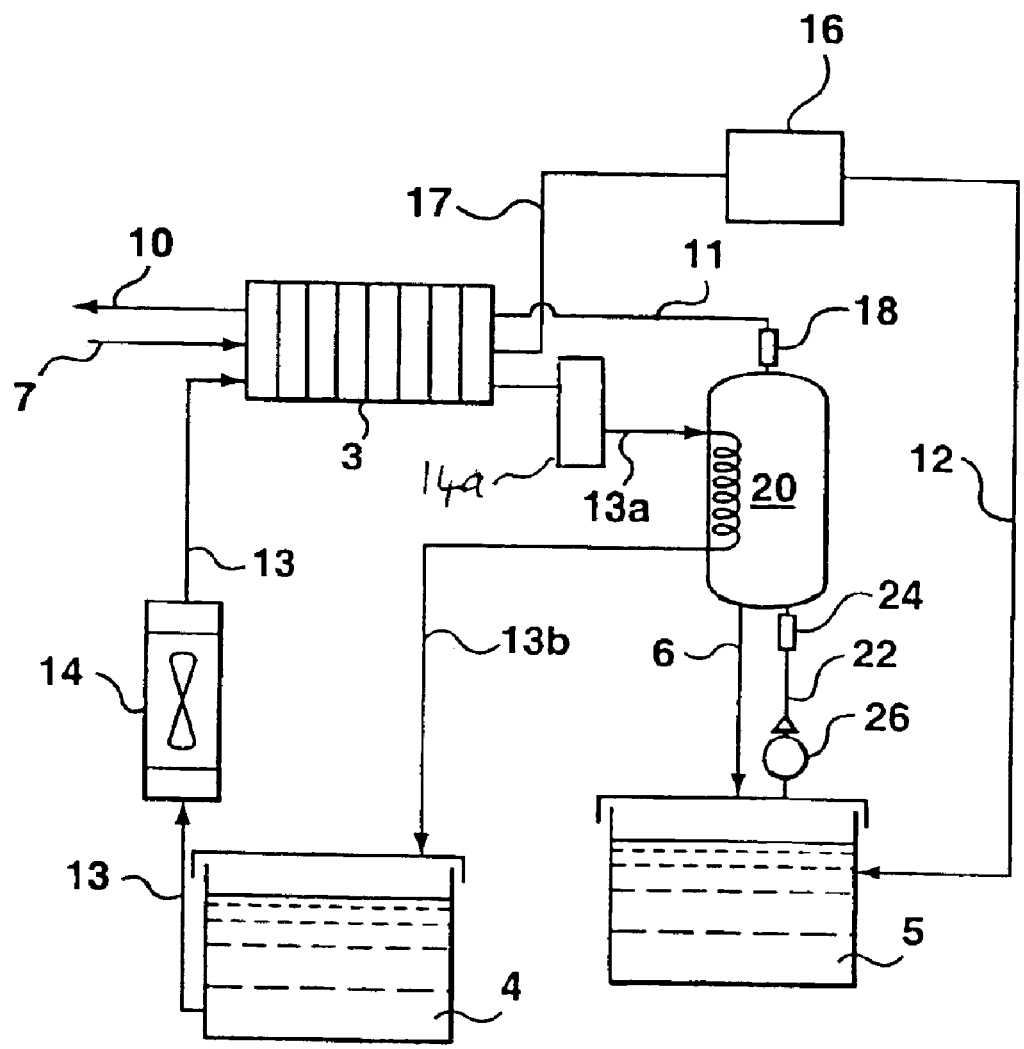
FIG. 1 is a schematic view of the first embodiment of the energy system according to the present invention.

Referring to FIG. 1, the chemical hydride power generation system according to the present invention combines a hydrogen generation system and a fuel cell system. The hydrogen generation system includes a chemical hydride storage tank 5 and a reactor 20. The fuel cell includes a fuel cell stack 3 and some peripherals, namely a coolant storage tank 4, a heat exchanger 14 and a gas-liquid separator 16. In this embodiment, the present invention is described by using $NaBH_4$ as an example of the chemical hydride used in the hydrogen generation system.

Chemical hydride is stored in the storage tank 5 in the form of solution. When hydrogen is demanded by the fuel cell stack 3, the hydride is supplied to the reactor 20 through a line 22 by means of a pump 26. The reactor 20 contains a catalyst for the reaction. Therefore, the hydride reacts within the reactor 20 and hydrogen is generated. The generated hydrogen flows out through a hydrogen outlet of the top of the reactor 20 and is supplied to an anode inlet of the fuel cell stack 3 via a hydrogen line 11. As is known in the art, the hydrogen reacts on the anode of the fuel cell stack 3 and the unreacted hydrogen leaves the fuel cell stack 3 through the anode outlet 10 thereof. The unreacted hydride in the form of solution, together with the by-product $NaBO_2$ returns to the storage tank 5 through line 6.

In the fuel cell stack 3, oxidant, typically air is introduced through an air inlet 7 into the cathode of the fuel cell stack 3. As is known to those skilled in the art, the oxygen in the air reacts at the cathode of the fuel cell stack 3 and generates water as a product. The unreacted air leaves the fuel cell stack 3 through the cathode outlet thereof and flows out through a discharged airline 17 as shown in FIG. 1.

As previously mentioned, the by-product of the hydrogen generation reaction, in this embodiment $NaBO_2$, is less soluble then the reactant $NaBH_4$. Specifically, $NaBO_2$ is only approximately 20% soluble. Therefore, as the hydrogen generation reaction continues, the concentration of $NaBO_2$ in the hydride solution stored in the storage tanks increases until it reaches the solubility of the $NaBO_2$. If the reaction continues, $NaBO_2$ in solid phase will occur in the storage tank and may be supplied to the reactor 20, resulting in clogging of the hydrogen generation system. Thus, the reaction degrades and not enough hydrogen will be supplied to the fuel cell stack 3. In conventional systems, in order to prevent this from happening, the initial concentration of the hydride in the solution has to be reduced to as low as 20% which is much lower than the borohydride solubility in water, 40%. Consequently, the achievable hydrogen storage density of the system is considerably limited. In this present invention, this problem is overcome by continuously introducing water into the hydride tank 5. As the hydrogen generation continues, the increase of $NaBO_2$ concentration in the solution is counteracted by the increase of solvent, i.e. water. Therefore, the initial concentration of the hydride can be higher than that is allowed in conventional systems, which results in higher hydrogen density of the system.

Preferably, the operation of continuously introducing water into the hydride tank 5 is achieved by recycling of the water entrapped in the fuel cell exhaust and supplying the water to the hydride solution. As shown in FIG. 1, water is generated on the cathode of the fuel cell stack 3 and is exhausted from the fuel cell stack 3 together with the unreacted air. The exhaust mixture of air and water then flows to a gas-liquid separator 16 in which air and water are separated. Therefore, the water is recovered. The recovered water is then introduced through a recovered water line 12 into the chemical hydride solution in the storage tank 5. As water is a by-product of the fuel cell reaction, the hydrogen generation system utilizes the readily available water in its vicinity, resulting in increased system efficiency. Generally, recovery of the exhaust water can enable the initial concentration of the hydride to be increased by at least 50%, as is demonstrated in the following tables.

TABLE 1

Conventional $NaBH_4$ water solution

| Iteration # | $NaBH_4$ (g) | WT % | $H_2O$ (g) | $NaBO_2$ (g) | WT % |
|---|---|---|---|---|---|
| 0.00 | 400.00 | 40.00% | 1000.00 | 0.00 | 0.00% |
| 1.00 | 350.00 | 36.75% | 952.37 | 86.97 | 9.13% |
| 2.00 | 300.00 | 33.16% | 904.73 | 173.94 | 19.23% |
| 3.00 | 250.00 | 29.17% | 857.10 | 260.90 | 30.44% |
| 4.00 | 200.00 | 24.71% | 809.46 | 347.87 | 42.98% |
| 5.00 | 150.00 | 19.69% | 761.83 | 434.84 | 57.08% |
| 6.00 | 100.00 | 14.00% | 714.20 | 521.81 | 73.06% |
| 7.00 | 50.00 | 7.50% | 666.56 | 608.78 | 91.33% |
| 8.00 | 0.00 | 0.00% | 618.93 | 695.74 | 112.41% |

TABLE 2

$NaBH_4$ water solution of the present invention

| Iteration # | $NaBH_4$ (g) | WT % | $H_2O$ (g) | $NaBO_2$ (g) | WT % | Recovered $H_2O$ (g) |
|---|---|---|---|---|---|---|
| 0.00 | 400.00 | 40.00% | 1000.00 | 0.00 | 0.00% | 0.00 |
| 1.00 | 350.00 | 33.41% | 1047.63 | 86.97 | 8.30% | 95.27 |
| 2.00 | 300.00 | 27.39% | 1095.27 | 173.94 | 15.88% | 95.27 |
| 3.00 | 250.00 | 21.87% | 1142.90 | 260.90 | 22.83% | 95.27 |
| 4.00 | 200.00 | 16.80% | 1190.54 | 347.87 | 29.22% | 95.27 |
| 5.00 | 150.00 | 12.11% | 1238.17 | 434.84 | 35.12% | 95.27 |
| 6.00 | 100.00 | 7.78% | 1285.80 | 521.81 | 40.58% | 95.27 |
| 7.00 | 50.00 | 3.75% | 1333.44 | 608.78 | 45.65% | 95.27 |
| 8.00 | 0.00 | 0.00% | 1381.07 | 695.74 | 50.38% | 95.27 |

Table 1 and table 2 respectively show the composition of $NaBH_4$, water and $NaBO_2$ in the solution during hydrogen generation reaction, for a conventional solution and for a solution in accordance with the present invention, in which the water is added as the reaction progresses. The initial concentration of $NaBH_4$ in both tables is 40%, that is to say, 400 g $NaBH_4$ in 1 L water. As the experimental data show, the conventional solution begins to clog when there is 300 g of $NaBH_4$ left in the solution. This is because the concentration of $NaBH_4$ is close to the initial 20% level, and exceeds this when the level of $NaBH_4$ has fallen to 250 g. The solution of the present invention (Table 2) only begins to clog when 250 g of $NaBH_4$ is left in the solution. Again, the table indicates that the critical 20% level for $NaBH_2$ is exceeded just before the amount of $NaBH_4$ falls to 250 g. It is clear that the present invention considerably increases the hydrogen generation capacity of NaBH4 water solution. The data shows that, by adding exhausted water, one can reduce the concentration of $NaBO_2$ effectively enabling the $NaBH_4$ level to be reduced further before clogging occurs. Table 1 shows, as expected due to utilization of $H_2O$ to generated hydrogen, that the amount of $H_2O$ reduces by over one third at the end of the experiment. Table 2 shows, due to the addition of the exhaust water, that the total volume of water increases to close to 1400 g. and is at 1142.90 grams of at iteration 3. This would require the tank 5 to have a larger volume. However, the initial amount of NaBH4 is increased by 50 g, that is 1/6 more than that in conventional systems. The increase of water happens only as the reaction continues. In this example, the amount of water is only increased by approximately 1/10, which means the recovery of water still has the effect of increasing the energy density of the overall system.

Since the reaction in the reactor 20 is exothermic, necessary cooling means has to be provided. Generally, cooling tubes can be provided within the reactor 20 in which a cooling fluid flows through. As shown in FIG. 1, in the present invention, the coolant for the hydrogen generation reaction can be water or other commonly used coolants for the fuel cell stack 3. Coolant enters the reactor 20 via a coolant inlet thereof from the coolant line 13a, flows through the coolant tubes in the reactor 20 and leaves the reactor 20 via a coolant outlet, taking away the heat generated in the reactor 20. Then the coolant returns to a coolant storage tank 4 at the coolant line 13b and is circulated to the fuel cell stack 3. Generally, a heat exchanger 14 is provided in the coolant line 13 before or after the coolant reaches the fuel cell stack 3 to maintain the coolant at a low temperature. Then the coolant flows through the fuel cell stack 3 and then into the reactor 20 and continues to circulate in the coolant loop. The heat exchanger 14 can in principle be located at any location in the coolant loop.

Figure 3:
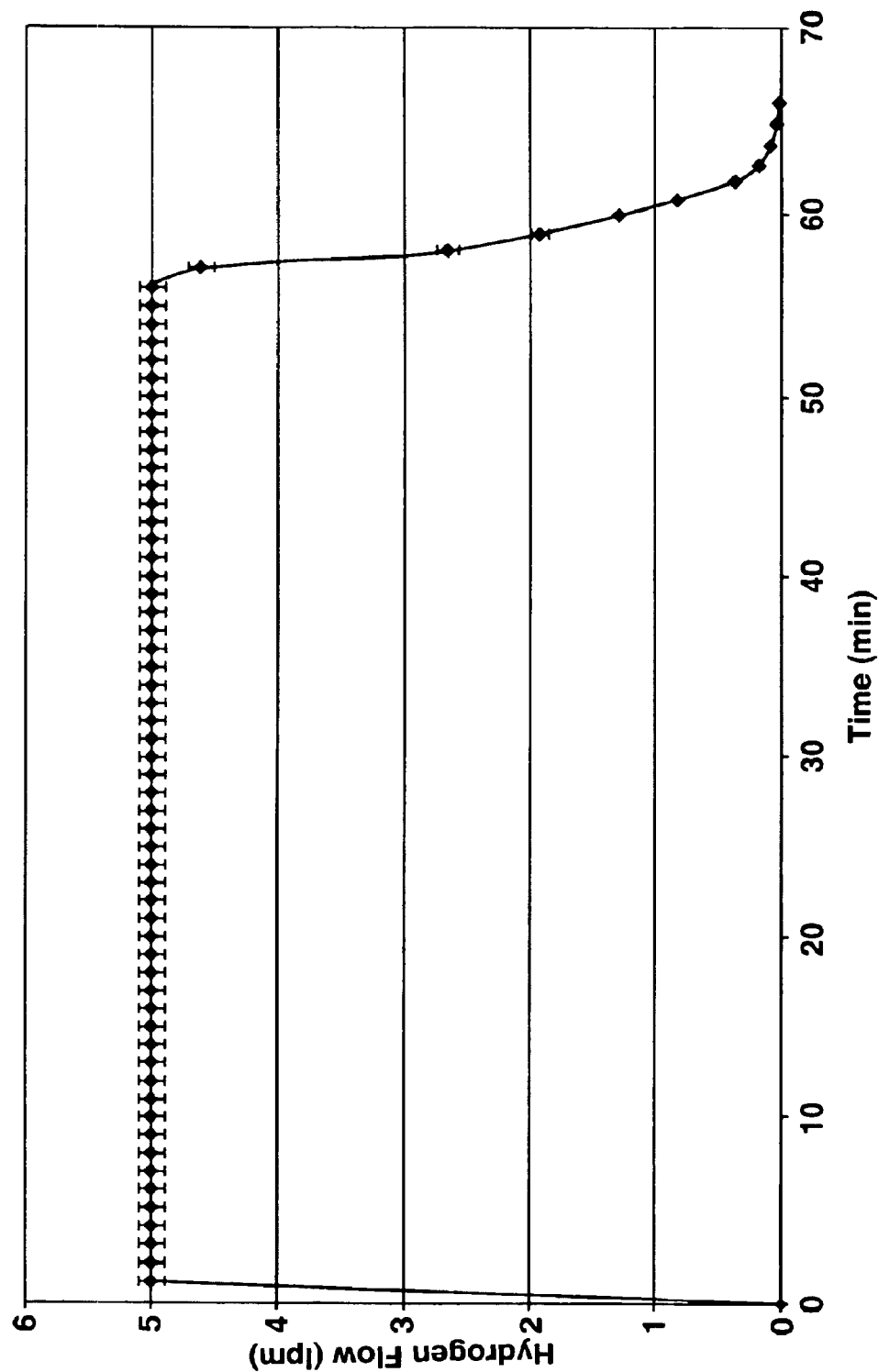
FIG. 3 is a diagram showing the hydrogen flow of the energy system according to the present invention during operation.

In operation, the fuel cell stack 3 generates electricity while consuming the hydrogen supplied from the reactor 20. In order to provide the hydrogen generation system with the load following ability, a pressure sensor 18 is provided at the hydrogen outlet of the reactor 20. The pressure sensor 18 is in connection with a switch 24 in hydride supply line 22 and controls the operation of the same, and the switch 24 controls the pump 26 pumping the solution from the tank 5 to the reactor 20. As the reaction in the reactor 20 continues, the hydrogen is generated and supplied to the fuel cell stack 3. However, when the fuel cell stack 3 operates in a condition that the hydrogen generation rate in the reactor 20 is more than the hydrogen consumption rate of the fuel cell stack 3, the pressure of hydrogen in the reactor 20 increases until it reaches a certain value when the pressure sensor 18 activates the switch 24 to shut down the pump, and hence cut the hydride supply to the reactor 20. Therefore the reaction in the reactor 20 stops. Then the fuel cell stack 3 continue to consume the hydrogen, resulting in the pressure drop of hydrogen in the reactor 20 until it reaches a certain value when the pressure sensor 18 controls the switch 24 to start the pump 26 and hence the hydride solution is supplied to the reactor 20 and in turn hydrogen is generated to meet the demand of the fuel cell stack 3. Thus the system of the present invention has the capability to follow the load as well as meet peak performance requirements. Additionally, when the fuel cell stack 3 shuts down, the pressure sensor 18 will immediately activate the switch 24 to shut down the pump 26. The reactor 20 preferably has a vent (not shown) so that the hydrogen present in the reactor at the time of shutdown and that generated thereafter can be released, either into the environment or a storage device. Hence the system can shut down completely in a relatively short time. FIG. 3 illustrates the hydrogen flow of the present system during operation at a constant rate, employing the pressure sensor 18 and the switch 24. As illustrated, the hydrogen flow is stable throughout the operation. It is to be understood that the drop of the hydrogen flow in the curve indicates the process of system shutdown.

Figure 4:
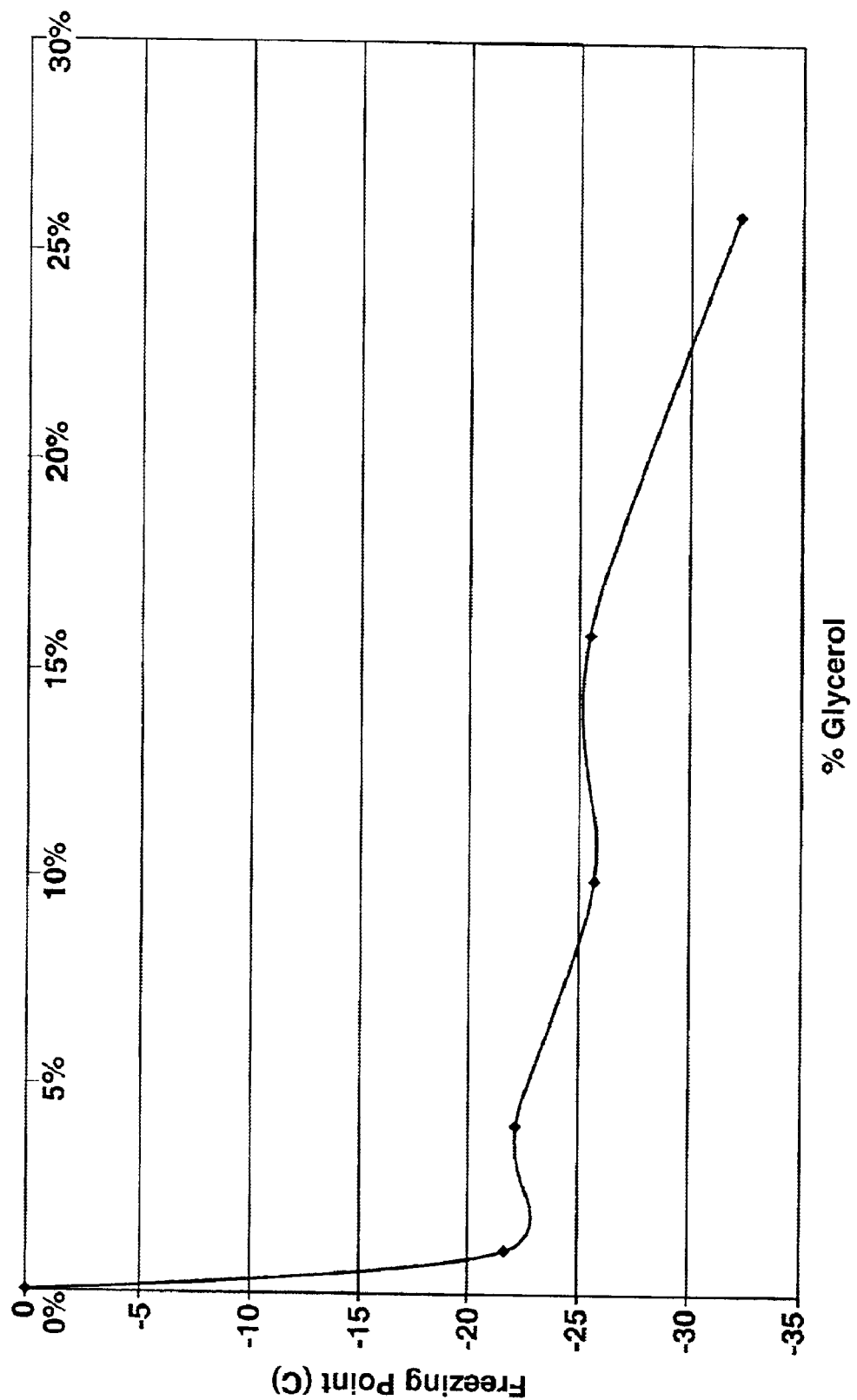
FIG. 4 is a diagram showing the relation of freezing point of the chemical hydride solution according to the present invention with the concentration of freezing point depressing agent in the solution.
Figure 5:
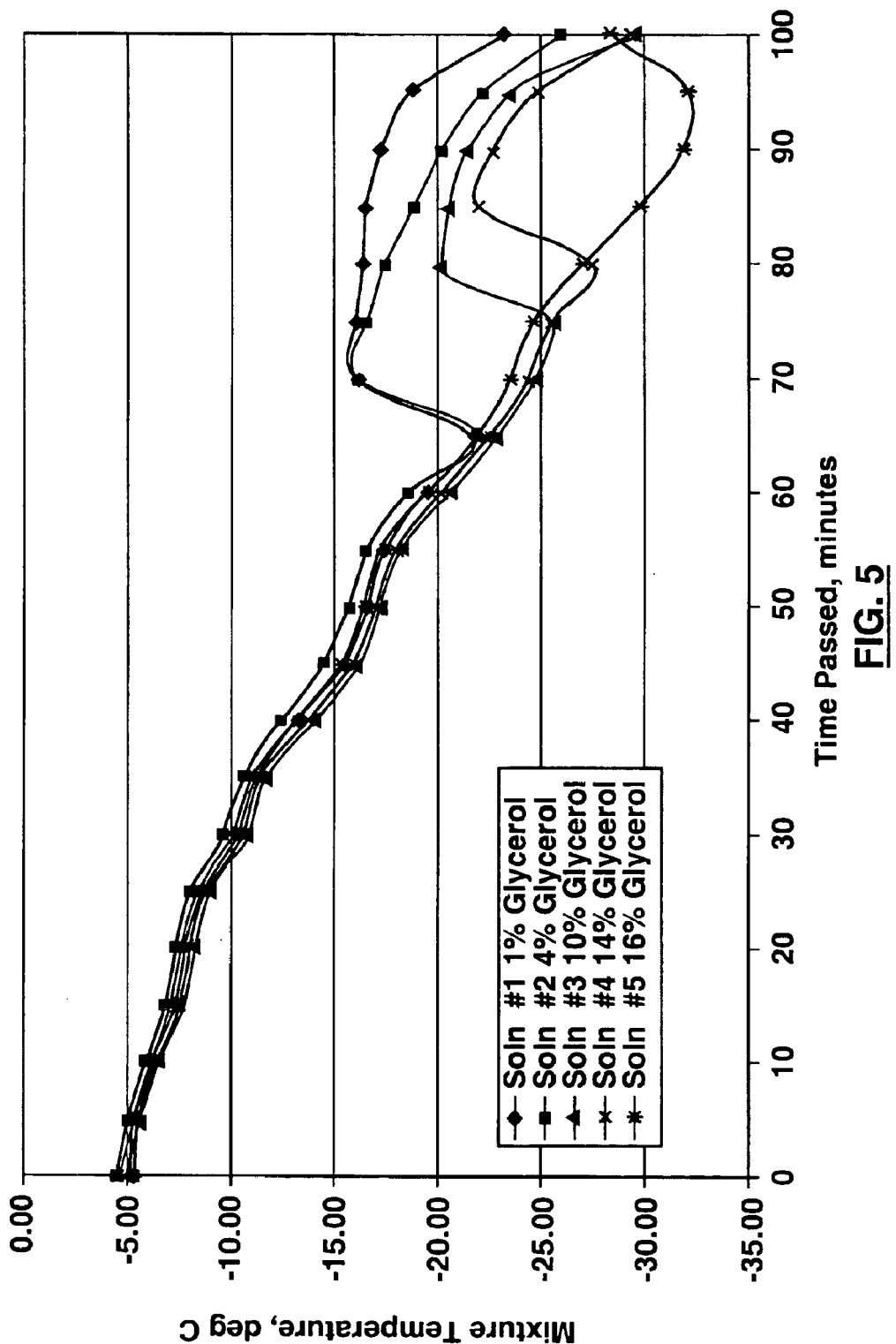
FIG. 5 is a diagram showing the relation of chemical hydride solution temperature according to the present invention with the concentration of freezing point depressing agent in the solution.

In practice, the fuel cell and the hydrogen generation system may work under low temperature. However, borohydride water solution freezes at about 0° C. In the present invention, the solution can be a borohydride water solution with glycerol and sodium hydroxide. As can be seen in FIG. 4, which shows the relation of freezing point of the solution with the concentration of the glycerol, the addition of glycerol considerably lowers the freezing point of the solution. For example, the solution is stable and can still operate at as low as −22° C. with 1% of glycerol. FIG. 5 shows the effects of various concentrations of glycerol on the freezing point of the solution. In FIG. 5, the sudden increase in the solution temperature indicates that the solution starts to freeze since the crystallization process is exothermic. As the concentration of glycerol increases, even lower freezing points can be obtained and an approximately −35° C. freezing point is achieved with 16% glycerol. However, the solubility of the borohydride, hence hydrogen density of the overall hydrogen generation system decreases with the increase in the concentration of glycerol. Experiments show that the concentration of glycerol is preferably lower than 5% and the best compromise between the freezing point and hydrogen density of the solution is 1% glycerol. 1% of glycerol does not noticeably compromise the borohydride solubility but achieves a freezing point of −22° C.

In order to further ensure that the system works properly under low temperature, the coolant in the present invention can also be used to heat the system. In this situation, another heat exchanger 14a may be added in the coolant line 13 between the fuel cell stack 3 and the reactor 20 so that the coolant can be further heated after it leaves the fuel cell stack 3. The heated coolant in turn heats the reactor 20 to facilitate the hydrogen generation reaction.

Preferably, the chemical hydride solution further includes alkaline additives, such as LiOH, KOH, NaOH to provide an alkaline condition, which significantly slows the chemical hydride reaction, thereby lengthening the shelf life of the solution. NaOH is mostly used due to its relatively low mass and cost. A concentration of 0.1% NaOH is adequate in raising the PH enough to stabilize the solution.

Figure 6:
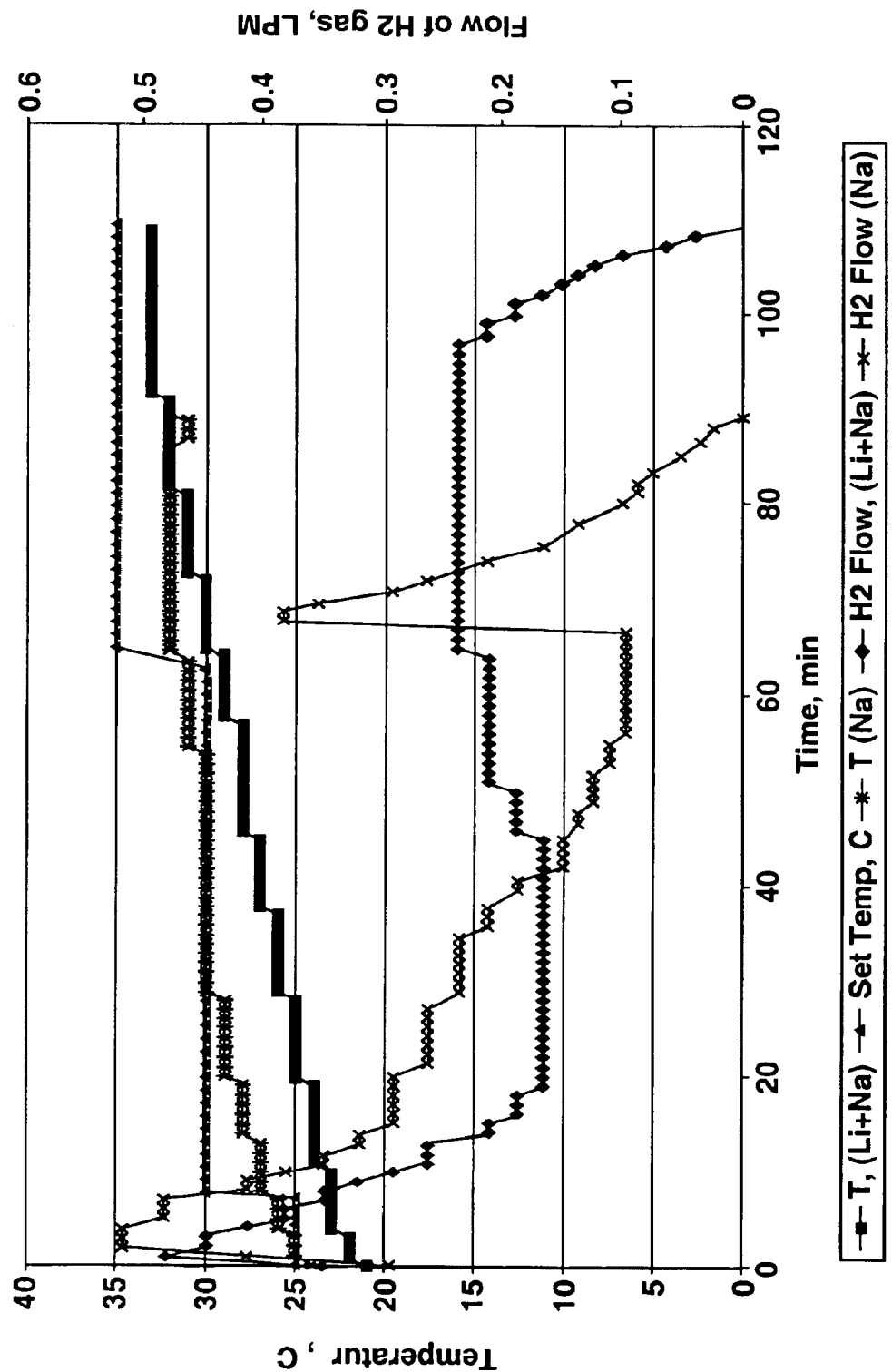
FIG. 6 is a diagram showing the comparison of two different chemical hydride solutions.

For $NaBH_4$, another additive, namely $LiBH_4$ may be added into $NaBH_4$ solution. This lighter material has a much higher hydrogen density than $NaBH_4$. However, the by-product of $LiBH_4$ and water reaction, $LiBO_2$, only has a solubility of 5% and the reaction of LiBH4 with water is much slower than that of NaBH4 and water. This means an addition of less than 5% $LiBH_4$ to the $NaBH_4$ solution will increase the hydrogen density of the solution without causing precipitation of the by-product and without significantly affecting its load following ability. FIG. 6 shows the comparison of $NaBH_4$ solution and $LiBH_4$—$NaBH_4$ solution. The generally lower reaction rate and slow rise in temperature indicate that the mixed solution is more stable than pure $NaBH_4$.

Figure 2:
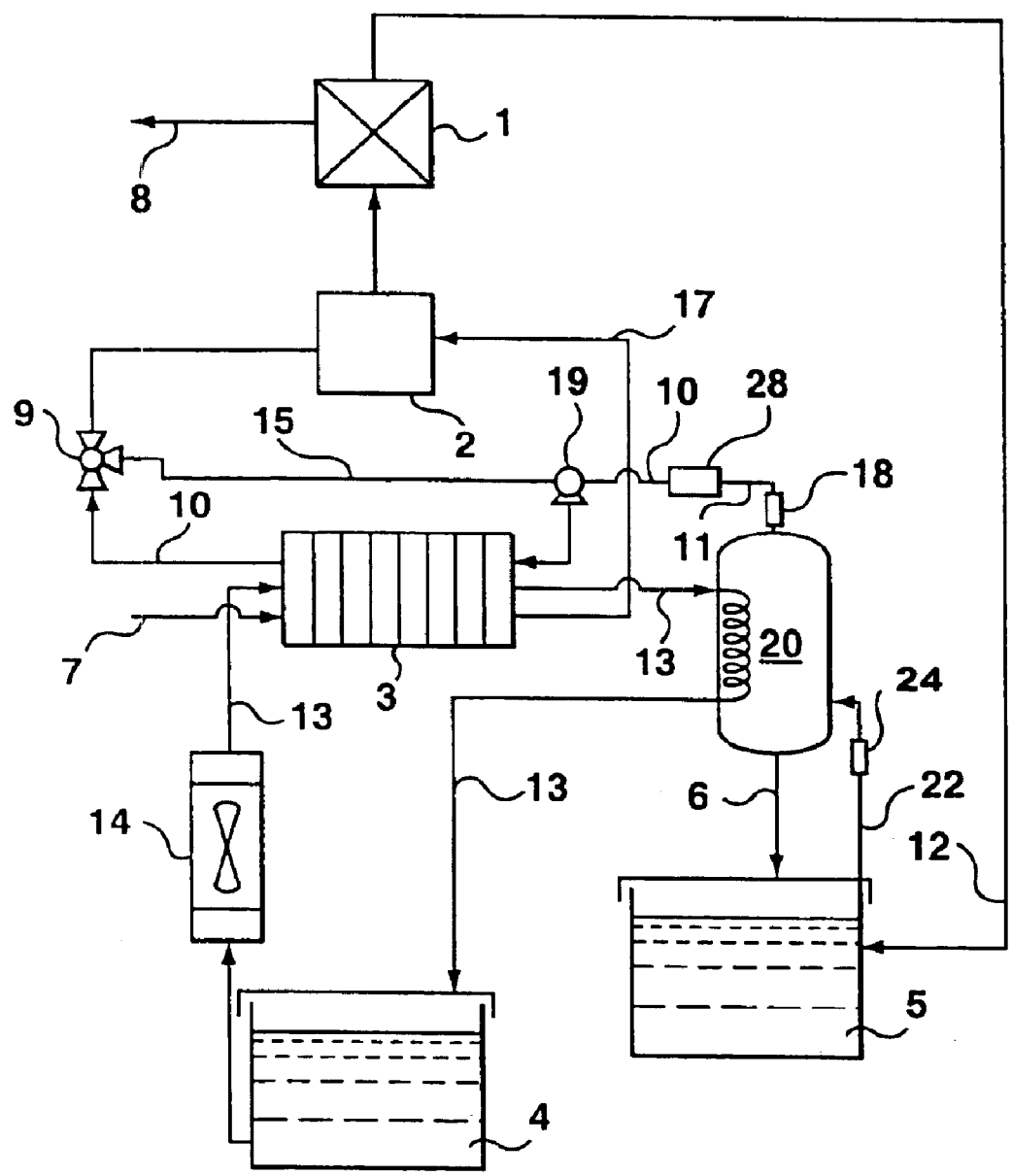
FIG. 2 is a schematic view of the second embodiment of the energy system according to the present invention.

Now referring to FIG. 2, a second embodiment of the present invention is shown. In this embodiment, similar components are indicated with same reference numbers. As can be seen in FIG. 2, the chemical hydride hydrogen generation system according to the present invention combines a hydrogen generation system and a fuel cell system. The hydrogen generation system generally includes a chemical hydride storage tank 5 and a reactor 20. The fuel cell includes a fuel cell stack 3 and some peripherals, namely a coolant storage tank 4, a heat exchanger 14, a catalytic burner 2 and a water recovery unit 1. In this embodiment, the present invention is also described using $NaBH_4$ as an example of the chemical hydride used in the hydrogen generation system.

The hydrogen is generated in the reactor 20 in the same manner as that in the first embodiment. Likewise, the coolant loop is also identical to that in the first embodiment. Therefore, for simplicity and brevity, the description of the components will not be repeated.

In this embodiment, hydrogen enters the fuel cell stack 3 from the hydrogen outlet of the reactor 20. Preferably, a filter 28 is provided in the hydrogen line 11 before the hydrogen enters the fuel cell stack 3 to remove fine aerosol particles in solution, catalyst and other particles (and this filter can be included in the first embodiment of FIG. 1). As is known to those skilled in the art, a considerable portion of both air and hydrogen supplied to the fuel cell stack 3 does not react. Rather, the excess hydrogen and air leave the fuel cell stack 3 through the anode and cathode outlets thereof, respectively. Therefore, it is preferable to recirculate the excessive hydrogen back to the fuel cell stack 3 for reaction. For this purpose, a hydrogen recycle loop 15 and a catalytic burner 2 are provided in this embodiment. As shown in FIG. 2, a valve 9 and a centrifugal pump 19 are provided respectively at the two ends of the hydrogen recycle loop 15. Specifically, a centrifugal pump 19 is provided at the junction of the hydrogen recycle loop 15 and the hydrogen line 11 between the reactor 20 and fuel cell stack 3, and a valve 9 at the junction of the hydrogen recycle loop 15 and the hydrogen line 11 between the fuel cell stack 3 and the catalytic burner 2. When the fuel cell stack 3 is in operation, the pump 19 operates continuously, creating a negative pressure to ensure the hydrogen generated in the reactor 20 continuously flows from the reactor 20 to the fuel cell stack 3 via the hydrogen line 11. Excessive hydrogen flows through the anode outlet 10 of the fuel cell stack 3 to the valve 9. The valve 9 is in a position that closes the hydrogen line 11 from the anode outlet 10 to the catalytic burner 2, thereby forcing the hydrogen to flow along the hydrogen recycle loop 15 and back to the fuel cell stack 3 for reaction by means of the pump 19. On a periodic basis, the valve 9 is turned to an open position so that the excess hydrogen flows to the catalytic burner 2. As can be seen in FIG. 2, the exhaust of the fuel cell from the cathode thereof also flows into a catalytic burner 2 along the respective line 17 thereof after leaving the fuel cell stack 3. In the catalytic burner, the hydrogen and the oxygen in the exhaust of the fuel cell react in the presence of an appropriate catalyst to form water in the known manner, i.e. $2H_2+O_2 \rightarrow 2H_2O$. Then the mixture of water and unreacted exhaust of the fuel cell flows from the catalytic burner 2 into a water recovery unit 1 which may be a gas-liquid separator. The water is separated from the mixture and circulates to the hydride storage tank 5. Recognizing that there will usually be an excess of air or hydrogen, an exhaust 8 is provided for venting residual gas into the environment from the water recovery unit 1. In practice, the opening of the valve 9 to let hydrogen flow to the catalytic burner 2 may be controlled by a controlling means, for example a timer (not shown). The opening of the valve 9 also prevents the fuel cell stack 3 from flooding due to the accumulation of water generated in the fuel cell reaction. The interval of opening valve 9 may be varied in various operation conditions and optimized by experiments.

Figure 7:
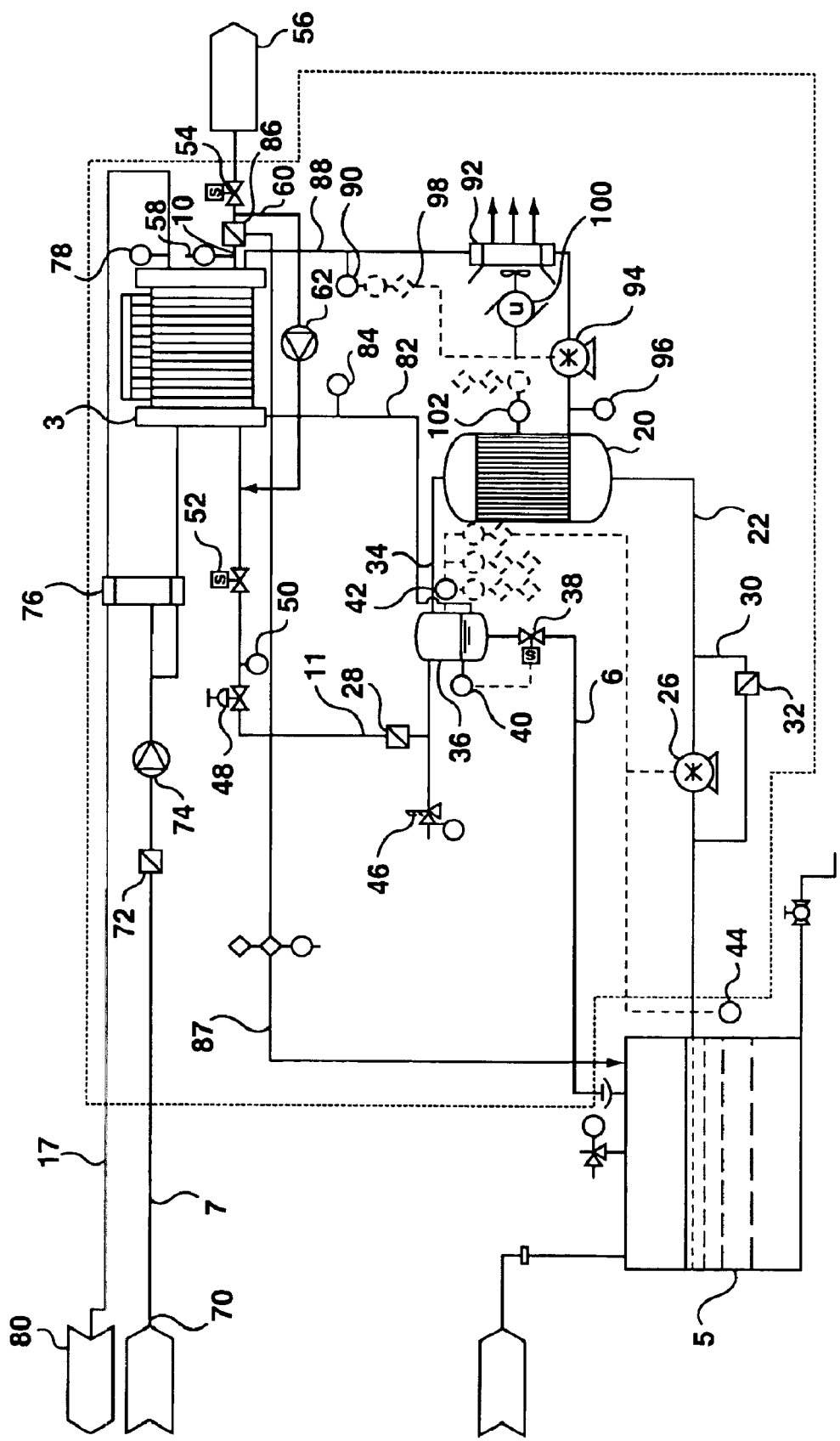
FIG. 7 is a schematic view of the third embodiment of the energy system according to the present invention.

Reference will now be made to FIG. 7, which shows a third embodiment of the apparatus. Some components of this third embodiment are similar to the earlier embodiments, and where applicable and for brevity, the same reference numeral is used to described these components and the description of these components is not repeated.

Fundamentally, this third embodiment of the apparatus provides a shared coolant system for the fuel cell stack 3 and the chemical hydride hydrogen generation system, which in turn provides advantages on the start-up mode of the system. Specifically, a common coolant or heat transfer circuit is provided, extending through both the fuel cell stack 3 and the reactor 20. This enables heat to be transferred between the fuel cell stack 3 and the reactor 20. More particularly, this arrangement enables heat from the hydrogen generation reaction to be used to heat up the fuel cell stack 3 in an initial startup mode, and following startup, a single heat exchanger can be provided, to extract heat from the system and to maintain both the chemical reactor 20 and the fuel cell stack 3 at a desired operating temperature.

In FIG. 7, considering first the hydrogen generation scheme, the hydride storage tank 5, as before, is connected through a line 22 containing a pump 26 to the reactor 20. A bypass line 30 is provided around the pump 26 including a pressure limiting check valve 32, set to maintain a desired pressure. The upper end of the reactor 20 is here connected by a line 34 to a liquid-gas separator 36.

The separator 36 has a lower liquid outlet connected by the return line 6 to the storage tank 5. In known manner, a solenoid valve 38 is connected to and controlled by a level switch 40, to maintain liquid level in the separator 36 within desired limits. As indicated at 42, also in known manner, one or more pressure transducers and a pressure controller can be provided, for monitoring the pressure in the separator vessel 36, and connected to the pump 26 and a further level switch 44 on the tank 5. Lines 22, 34 and 6 form a circuit for circulating the chemical hydride solution through the reactor 20.

An upper, gas outlet of the liquid gas separator vessel 36 is connected the hydrogen supply line 11, including the filter 28 for filtering out any aerosols present in the gas flow. For safety purposes, a pressure relief valve 46 is also connected to the outlet of the separator vessel 36, and arranged to vent to the exterior. A pressure reducing valve 48 reduces the gas pressure to, for example 3 PSIG, or other desired value and a pressure indicator is provided at 50, also connected to the line 11. A solenoid valve 52 is provided in the line 11 immediately upstream of the fuel cell stack 3.

The hydrogen or anode outlet line 10 of the fuel cell stack 3 is connected through a solenoid valve 54 to a hydrogen exhaust or vent 56. A temperature transmitter 58 is provided for monitoring the temperature of exhausted hydrogen. A catalytic burner (not shown), with its own oxidant input can be connected to the hydrogen exhaust or vent 56, for consuming vented hydrogen.

A liquid-gas separator 86 is provided in the anode outlet line 10 for separating water from exhaust hydrogen. A hydrogen return line 60 is connected to the outlet line 10 downstream of the separator 86 and includes a diaphragm pump 62, for recirculating the separated hydrogen through the fuel cell stack 3. The water recovered from the separator 86 is circulated back to hydride solution storage tank 5 through a return line 87 to increase the volume of water as the chemical hydride is consumed, and this compensates for the increasing concentration of the less soluble byproduct $NaBO_4$. Note that not all the generated water need be supplied to the storage tank 5, and some can be discharged, as required.

Turning to the air or oxidant circuit, ambient air is supplied through the inlet line 7 to a main oxidant inlet, indicated at 70. The line 7 then includes an aerosol filter 72 and a pump 74, that pumps the air through an enthalpy exchange device 76. The exchange device 76 exchanges heat and moisture between the incoming and exhaust air streams, so that the incoming airstream has desired temperature and humidity characteristics. The heated and humidified air is then supplied to the fuel cell stack 3.

The exhaust or discharged airline 17 then has a temperature transmitter 78, at the outlet of the fuel cell stack 3. The line 17 then passes through the enthalpy exchanger device 76 for exchanging heat and moisture as mentioned above. The air is then passed to an air exhaust 80.

Now in accordance with this embodiment of the invention, a coolant loop is provided. For this purpose, the reactor vessel 20 has a coolant inlet connected to a return line 88 and a coolant outlet connected to a supply line 82, connected to a coolant inlet port of the fuel cell stack 3. The line 82 includes a respective temperature transmitter 84. This coolant loop or circuit is filled with deionised water. As is known, to allow for expansion and contraction, a storage vessel can be connected into the circuit and maintained at a desired pressure. Also, although not shown, the lines 82, 88 are not connected directly into the interior of the reactor 20; instead, the lines 82, 88 are connected to a heat exchange element or coil within the reactor 20, that maintains separation between the chemical hydride solution and the deionised water, while enabling heat transfer to occur.

A coolant outlet port of the fuel cell stack 3 is connected to a return line 88, also including a respective temperature transmitter 90. The return line then passes through an air-cooled heat exchanger 92 and a pump 94 before returning to the reactor vessel 20. The pump 94 circulates the coolant from the reactor 20 through the fuel cell stack 3. A further temperature transmitter 96 is provided immediately upstream of the reactor vessel 20.

The temperature transmitter 90 is connected to a temperature controller 98, which in turn is connected to the pump 94 and the motor of a fan 100, for controlling the pump 94 and the fan 100. The fan 100 serves to blow cooling air over the heat exchanger 92.

It will be understood that other pressure and temperature transducers are provided as required, for example, a temperature transmitter 102, for monitoring the temperature in the reactor vessel 20.

Since the hydrogen generation reaction and the fuel cell reaction are both exothermic, the heat generated in both reactions can be utilized in order to achieve optimum operating conditions rapidly. Accordingly, in a startup mode, a heater is not provided. Instead, during startup, the cooling fan 100 is turned off, and the pump 94 operated to circulate the coolant through the cooling channels of the fuel cell stack 3. Consequently, heat generated by both the fuel cell stack and generation of hydrogen in the reactor vessel 20 are retained in the system, and both the reactor vessel 20 and the fuel cell stack 3 heat up to desired operating temperatures.

When the system is initially started-up, there is a lag time for electricity generated by the fuel cell stack. This is because there is insufficient hydrogen available and the fuel cell stack is too cold therefore, initially the reactor 20 generates more heat and this heat is transferred by the flow of the coolant to the fuel cell stack. This warms up the fuel cell stack and enhances the fuel cell reaction. Therefore, the fuel cell reaction proceeds faster than when the stack starts from cold condition and the stack generates more heat. When the fuel cell stack begins to produce electricity, the heat from the fuel cell stack 3 is transferred back to the reactor 20. The mutual heating allows the system to reach a steady state at a faster rate than conventional systems that rely on some auxiliary heating device. However, the circuit through the reactor and the fuel cell stack in lines 82 and 88 can include a heater (not shown) to further enhance system performance.

Once the desired operating temperature is reached, then, as sensed by the temperature transmitter 90, the fan 100 can be actuated, and the system kept within a desired range of temperatures.

Figure 8:
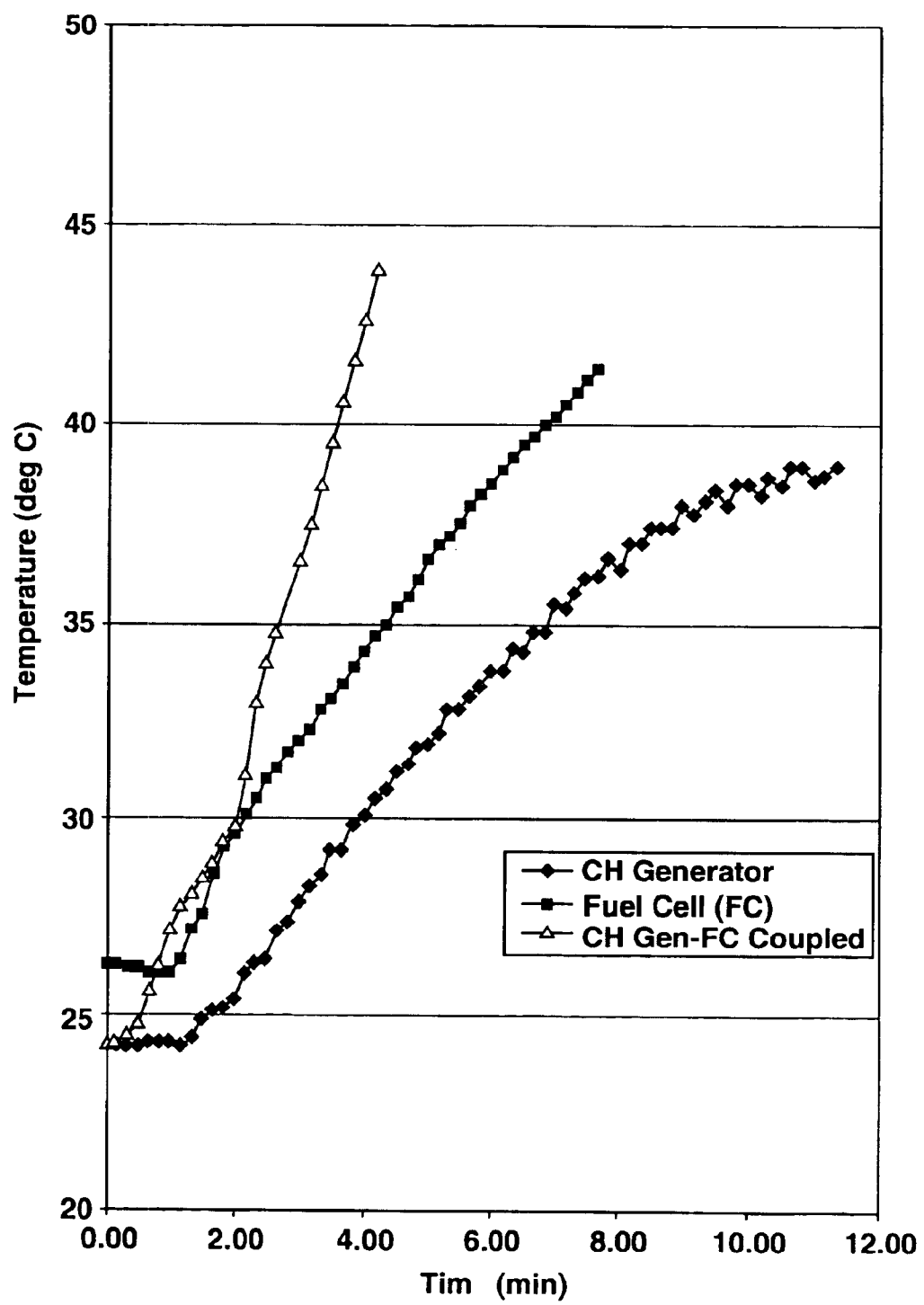
FIG. 8 is a diagram showing the heat transfer effect in the third embodiment of the energy system according to the present invention.

Reference will now be made to FIG. 8, which shows the relation between the coolant outlet temperature and time, and in all cases the measurements were carried on the configuration of FIG. 7, measuring the coolant temperature at the outlet of the fuel cell stack 3, and in all cases with coolant being circulated. Line 200 indicates the temperature increase when the fuel cell stack is running alone without the chemical hydride reactor. Line 201 indicates the process of temperature increase when the chemical hydride reactor is running alone. Line 203 indicates the temperature increase in this embodiment, i.e. with both the fuel cell stack 3 the reactor 20 operating. As can be seen, the temperature increase of the coolant is much faster when the two devices mutually heat each other. This clearly shows the heat transfer effects of this embodiment. This is believed to be due to the fact that initial heat from the chemical hydride reaction accelerates heating of the fuel cell stack, which in turn starts to react at a higher rate and produce significant heat more quickly, thereby increasing the reaction rate of the chemical hydride reactor; together this leads to more rapid heat generation and heating up of the system.

Another benefit associated with this embodiment is that the initial concentration of the chemical hydride solution can be further increased. The reason is that the unreacted chemical hydride solution picks up heat from the reactor when flowing through it and in turn warms up the storage tank. As is known, the solubility of the solutes in the solution increases with the temperature. Therefore, the energy density of the whole energy system is further increased.

The present invention has been described in detail in a number of embodiments. It should be appreciated that the chemical hydride that can be utilized in this invention includes but not limited to borohydride such as NaBH4 and $LiBH_4$, other types of chemical hydrides may also be used, such as $B_2H_6$, $LiAlH_4$, $NH_3BH_3$, etc. Likewise, the fuel cell stack 3 in the present invention can be any type of fuel cell using pure hydrogen as a fuel.

It is anticipated that those having ordinary skills in the art can make various modifications to the embodiments disclosed herein after learning the teaching of the present invention. For example, the number and arrangement of components in the system might be different, different elements might be used to achieve the same specific function. However, these modifications should be considered to fall under the protection scope of the invention as defined in the following claims.

What is claimed is:

1. A method of operating a fuel cell stack and chemical hydride hydrogen generation system with a catalyst including a reactor for generating hydrogen for the fuel cell stack and controlling the temperature of the fuel cell stack and the chemical hydride generation system, the method comprising the steps of:

1) supplying a chemical hydride solution to the reactor, and permitting the catalyst to catalyze reaction of the chemical hydride solution to generate hydrogen;

2) supplying the hydrogen to the fuel cell stack and supplying an oxidant to the fuel cell stack, for generation of electricity;

3) circulating a heat transfer fluid through the fuel cell stack and the chemical hydride generation system, to effect heat transfer therebetween; and 4) when required, providing additional heat to the heat transfer fluid.

2. A method as claimed in claim 1, wherein in step (3) on initial startup, the method includes permitting heat generated in the reactor to heat up the heat transfer fluid, passing the heated fluid through the fuel cell stack to promote heating of the fuel cell stack while permitting heat generated in the fuel cell stack to heat up the fluid, and circulating the fluid back to the reactor, thereby bringing the fuel cell stack and the reactor to respective optimum operating temperatures.

3. A method as claimed in claim 1 or 2, further includes passing the heat transfer fluid circulated through the fuel cell stack and the chemical hydride hydrogen generation system through a heat exchanger, and operating the heat exchanger to control the temperature of the chemical hydride solution.

4. A method as claimed in claim 3, which includes actuating the heat exchanger to maintain chemical hydride solution at an operating temperature once the reactor and the fuel cell stack reach their operating temperatures.

5. An energy system comprising:
a fuel cell stack for generating electricity from hydrogen and an oxidant to form water;
a chemical hydride hydrogen generation system, comprising:
a storage means for storing a chemical hydride solution comprising a solution of a chemical hydride solute in a solvent;
a reactor containing a catalyst, for catalyzing reaction of the chemical hydride to generate hydrogen;
a first pump means connected between the storage means and the reactor in a first circuit, for circulating the chemical hydride solution through the storage means and the reactor, so that the chemical hydride reacts to generate hydrogen in the presence of the catalyst;
a first connection between the chemical hydride generation system and the fuel cell stack for supplying hydrogen to the fuel cell stack; and
a heat transfer circuit including second connections between the chemical hydride generation system and the fuel cell stack, for circulation of a heat transfer fluid through the fuel cell stack to effect heat transfer between the fuel cell stack and the chemical hydride solution, the heat transfer circuit including a heater for heating the heat transfer fluid.

6. An energy system as claimed in claim 5, which includes means for controlling the temperature in the heat transfer circuit, and including the heater for the heat transfer fluid.

7. An energy system as claimed in claim 6, where said means for controlling the temperature includes a heat exchanger.

8. An energy system as claimed in claim 7, wherein the heat exchanger includes a fan for forcing cooling air through the heat exchanger to effect heat transfer.

9. An energy system as claimed in claim 8, which includes a second pump means in the heat transfer circuit for circulating the heat transfer fluid therethrough.

10. An energy system as claimed in claim 9, which includes a temperature transducer in the heat transfer circuit, connected to at least the second pump means, for controlling the second pump means.

11. An energy system as claimed in claim 10, wherein the temperature transducer is connected to the fan for actuating the fan in dependence upon the sensed temperature.

12. An energy system as claimed in claim 9, 10 or 11, wherein the reactor includes a heat transfer element and wherein the second connections are made to the heat transfer element of the reactor.

13. An energy system as claimed in claim 9, which includes a gas and liquid separator is provided in the first circuit, between the reactor and the storage means for separating generated hydrogen from the chemical hydride solution, wherein the separator includes an outlet for hydrogen, and wherein said first connection is provided between said outlet for hydrogen and the fuel cell stack.

14. An energy system as claimed in claim 13, wherein the fuel cell stack includes a hydrogen inlet and a hydrogen outlet, and wherein a liquid-gas separator is connected to the hydrogen outlet for separating water from exhausted hydrogen and wherein a return line is provided between the hydrogen outlet and the chemical hydride storage means, for supplying separated water to the chemical hydride solution.

15. An energy system as claimed in claim 14, wherein the fuel cell stack includes a hydrogen inlet and a hydrogen outlet, and wherein a recirculation duct is connected between the hydrogen outlet and the hydrogen inlet of the fuel cell stack and wherein a third pump means is provided in the recirculation duct, for recirculating hydrogen from the hydrogen outlet to the hydrogen inlet of the fuel cell stack.

16. An energy system as claimed in claim 15, which includes a hydrogen vent connected through a valve to the hydrogen outlet to the fuel cell stack.

17. An energy system as claimed in claim 16, wherein the hydrogen vent is connected to a catalytic burner and wherein the catalytic burner is provided with an inlet for an oxidant, for consuming excess, vented hydrogen.

18. An energy system as claimed in claim 13, which includes an aerosol filter provided in said first connection, for filtering aerosol particles out of the hydrogen flow upstream from the fuel cell stack.

19. An energy system as claimed in claim 9, wherein the fuel cell stack includes an oxidant inlet and an oxidant outlet, wherein a main oxidant inlet is connected by an oxidant inlet line to the oxidant inlet of the fuel cell stack, a fourth, oxidant pump is provided in the oxidant inlet line, an oxidant exhaust line is connected to the oxidant outlet, and wherein an enthalpy exchange device is provided between the oxidant inlet line and the oxidant exhaust line for transfer of enthalpy between an incoming oxidant stream and an exhaust oxidant stream.

20. An energy system as claimed in claim 13, which includes a first level switch on the separator, for the level of chemical hydride solution in the separator and a level control valve connected between the separator and the storage means and to the first level switch, the level control valve being actuated to maintain a desired level of the chemical hydride solution within the separator.

21. An energy system as claimed in claim 20, which includes second level switch on the storage means and connected to the first pump means for control thereof.

22. An energy system as claimed in claim 21, which includes a pressure transducer connected for monitoring the pressure of generated hydrogen, a pressure controller connected to the pressure transducer and to the first pump means, for controlling the first pump means, to control the pressure of generated hydrogen.

23. An energy system as claimed in claim 9, 13, 19 or 22, wherein the fuel cell stack comprises a plurality of individual fuel cells, and wherein coolant ducts are provided between the fuel cells and connected in the heat transfer circuit.

* * * * *